United States Patent

Tuman, II

[11] Patent Number: 5,730,495
[45] Date of Patent: Mar. 24, 1998

[54] FOLDING SEAT ASSEMBLY

[75] Inventor: William Tuman, II, Colona, Ill.

[73] Assignee: Sears Manufacturing Company, Davenport, Iowa

[21] Appl. No.: 654,085

[22] Filed: May 28, 1996

[51] Int. Cl.⁶ ....................................... A47C 1/02
[52] U.S. Cl. ...................... 297/331; 297/378.1; 296/65.1
[58] Field of Search ........................ 297/313, 325, 297/326, 331, 344.1, 378.1; 296/65.1, 64

[56] References Cited

U.S. PATENT DOCUMENTS

| | | | |
|---|---|---|---|
| 2,160,482 | 5/1939 | McGregor | 297/331 |
| 3,261,422 | 7/1966 | Jensen | 297/331 |
| 3,288,527 | 11/1966 | Martens . | |
| 3,463,542 | 8/1969 | Daniels | 297/331 |
| 3,881,770 | 5/1975 | Cardenas . | |
| 4,376,552 | 3/1983 | Pilhall . | |
| 4,429,761 | 2/1984 | Haddock, Jr. et al. | 296/65.1 X |
| 4,696,508 | 9/1987 | Braungam | 296/65.1 |
| 4,699,418 | 10/1987 | Plavetich | 296/65.1 |
| 4,749,232 | 6/1988 | Guichon . | |
| 4,890,881 | 1/1990 | Ollat . | |
| 4,978,170 | 12/1990 | Pelz . | |
| 5,269,588 | 12/1993 | Kunz . | |
| 5,398,995 | 3/1995 | Hurite . | |

FOREIGN PATENT DOCUMENTS

| | | |
|---|---|---|
| 243629 | 11/1965 | Austria . |
| 555872 | 4/1958 | Canada . |
| 1254712 | 1/1961 | France . |
| 632143 | 7/1936 | Germany . |
| 1086130 | 7/1960 | Germany . |
| 4140610 | 6/1993 | Germany . |
| 1086973 | 10/1967 | United Kingdom . |
| 2155780 | 10/1985 | United Kingdom . |

*Primary Examiner*—Laurie K. Cranmer
*Attorney, Agent, or Firm*—Niro, Scavone, Haller & Niro

[57] ABSTRACT

A folding seat mounted on a rotatable surface comprising a seat base, a seat bottom, a seat backrest frame, a backrest, and a linkage assembly including a hip restraint rotatably attaching the backrest to the base such that the seat backrest and hip restraint fold forward and down simultaneously relative to the base to allow greater access to behind and below the seat.

10 Claims, 5 Drawing Sheets

FOLDING SEAT ASSEMBLY

BACKGROUND OF THE INVENTION

The present invention relates generally to seats and, more specifically, to assemblies used for folding seats.

Folding seats are commonly used in vehicles and other places to allow access behind the seat, among other reasons. The backrest of these seats generally pivots from a point behind the seat cushion and folds down over the seat cushion. Such a folding seat can be bulky when folded down because the backrest is folded down, in place, on top of the seat cushion. Furthermore, industry standards and guidelines sometimes require that some seats include side hip restraints. In these seats, prior art folding seats did not provide for folding the hip restraint with the seat back and this caused the folded seat to be even more bulky when accessing an area behind the seat.

Additionally, there is a need in some vehicles, particularly industrial vehicles like forklifts, to fold the backrest down to obtain access behind the seat and also to raise the entire seat assembly to gain access under the seat. The usable space in these types of vehicles is very restricted and, thus, the folding seat and seat area in general must be as compact as possible. In such vehicles, it would be very useful to have a seat which folds forward as it folds down to allow enhanced access to behind the seat, and to allow the hip restraint to fold down with the seat backrest, and to be mounted to a rotatable platform to allow the entire seat to be rotated upward to allow access to beneath the seat while preventing the seat from obstructing whatever may be stored behind the seat.

SUMMARY OF THE INVENTION

A primary object of the present invention is to provide a folding seat assembly which allows folding of the backrest of the seat from a point forward of the backrest, and allows the folding of a hip restraint with the seat backrest to maximize access to behind the seat. A further, related object of the present invention is to utilize this folding set assembly in an environment which allows rotation of the entire seat assembly to allow maximum access beneath the seat. The seat assembly of the present invention therefore utilizes a novel assembly of seat base frame, hip restraint and linkage assembly with a folding backrest, mounted on a rotatable platform. The present invention thus allows the backrest of a seat to travel forward as it folds down to allow greater accessibility to the space behind the seat and under the seat.

Another object of the present invention is to provide a folding seat with an integral hip restraint which folds down with the backrest of the seat to maximize accessibility behind the seat.

A still further object of the present invention is to provide a folding seat with a backrest which folds forward as it folds down with a support structure supporting the seat which rotates upward to allow access under the seat.

An additional object of the present invention is to provide a folding seat which maximizes accessibility behind the seat and under the seat which is relatively easy and inexpensive to manufacture and maintain.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
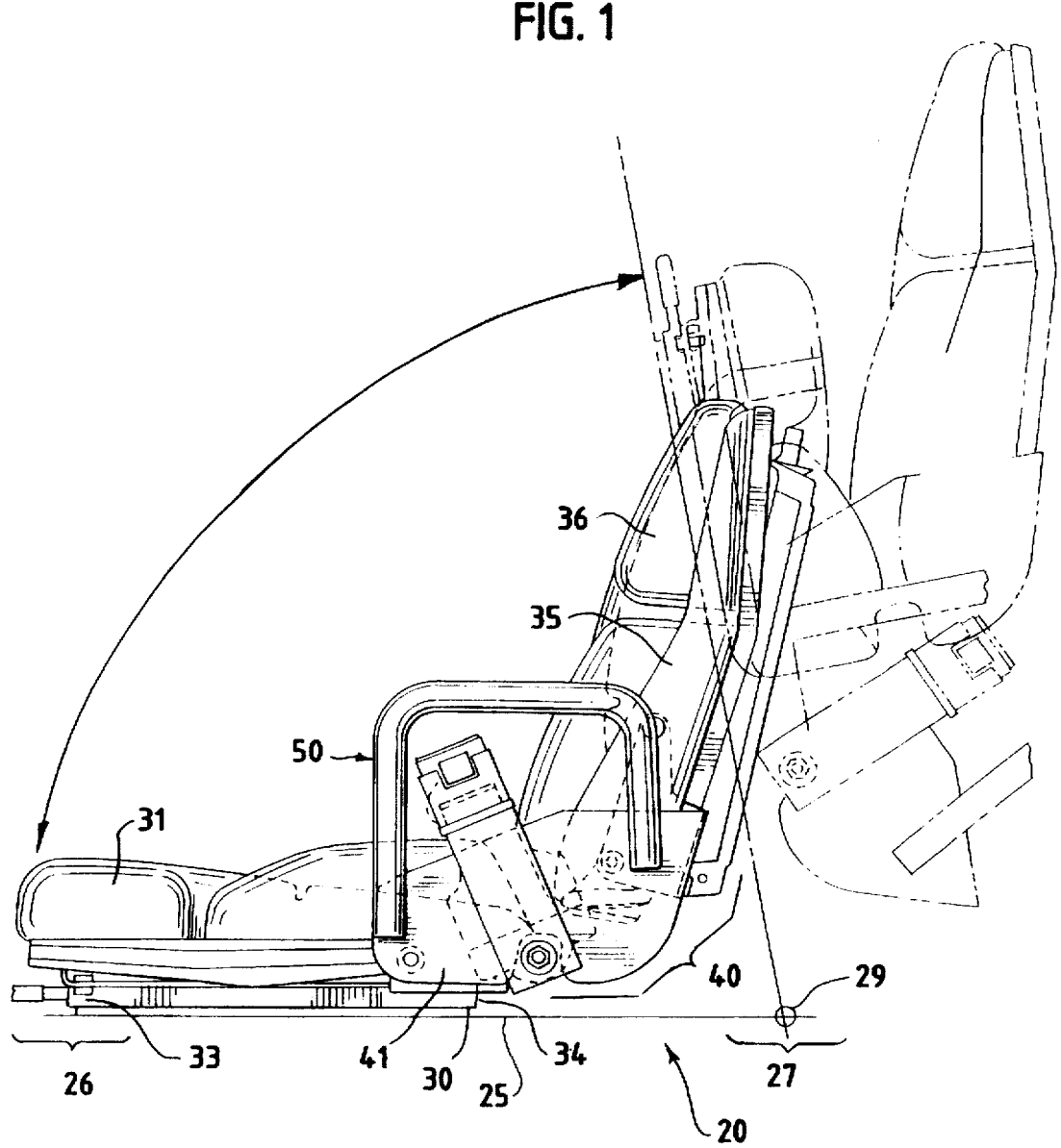
FIG. 1 is a side view of the seat in unfolded, unrotated position and in a folded, rotated position.

The preferred embodiment of the present invention, as seen in FIG. 1 and designated generally 20, includes a base 30 having a forward portion 33 and rearward portion 34, a seat bottom cushion 31 attached to the base 30, a seat back frame 35 having a seat backrest cushion 36 attached thereto, and a linkage assembly 40 rotatably securing the seat back frame 35 to the base 30. The linkage assembly 40 includes a weldment 41 having a hip restraint 50 securely attached thereto. Base 30 is mounted to a positionable mounting platform 25 having a forward end 26 and hinged rearward end 27.

As best seen in FIGS. 1, 2, 4 and 5, base 30 is fixedly mounted to positionable platform 25. Base 30 has depending flange 32 along its sides extending from forward portion 33 to rearward section 34. As best seen in FIGS. 6–9, attached to the left side of rear section 34 of flange 32 is bracket 71 having outwardly and upwardly extending first ear 72 and second ear 73. Within first ear 72 is stop aperture 74 in which resides stop 51. Forward of first ear 72, second ear 73 has pivot aperture 75. Pivot aperture 75 thus defines a pivot location which, as that term is used in regards to this invention, is a generally central location along base 30 intermediate forward portion 33 and rearward portion 34. Stop 51 resides in stop aperture 74, and preferably secures seat belt means 60.

Similarly, attached to the right side of rear section 34 of flange 32 is bracket 76 having outwardly and upwardly extending first ear 77 and second ear 78. Within first ear 77 is stop aperture 79 in which resides stop 51. Forward of first ear 77, second ear 78 has pivot aperture 80. Pivot aperture 80 is coaxial with pivot axis 75 and, thus, also defines a pivot location which is a generally central location along base 30 intermediate forward portion 33 and rearward portion 34. Stop 51 resides in stop aperture 79, and preferably secures seat belt means 60.

Figure 2:
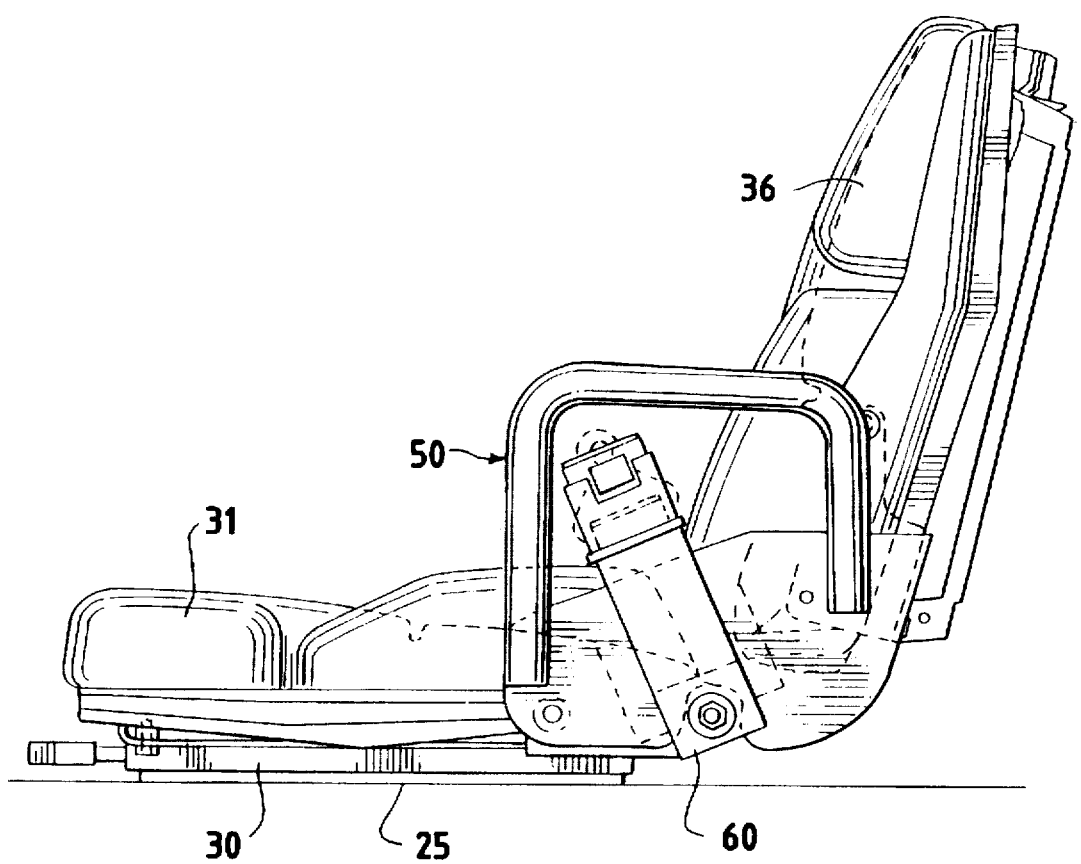
FIG. 2 is a side view of the seat base, hip restraint and linkage assembly of the present invention.

Rotatably secured within pivot apertures 75, 80 of ears 73, 76 is restraint weldment 41 at approximately its forward-most end, via pivot bolt 55 through pivot apertures 75, 80 and forward aperture 43 of weldment 41. Rearward of forward aperture 43, weldment 41 has notch 42 which communicates with stop 51 residing in stop aperture 74 when weldment 41 is in its non-rotated position, as seen in FIG. 2. In this position, seat 20 is said to be in its operating position. Notch 42 thus acts as a backrest pivot stop against stop 52.

Figure 3:
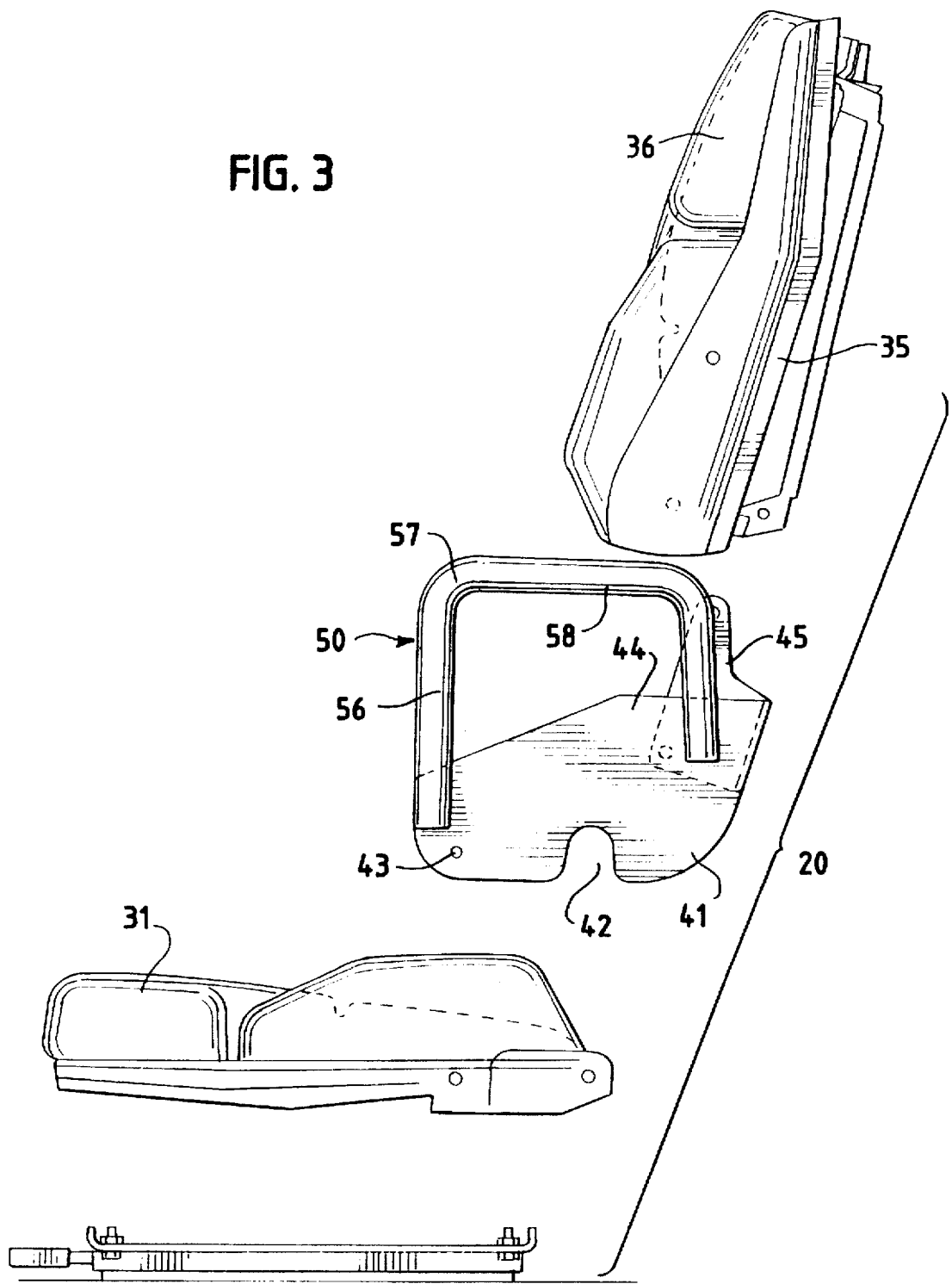
FIG. 3 is an exploded view of the folding seat of the present invention.
Figure 4:
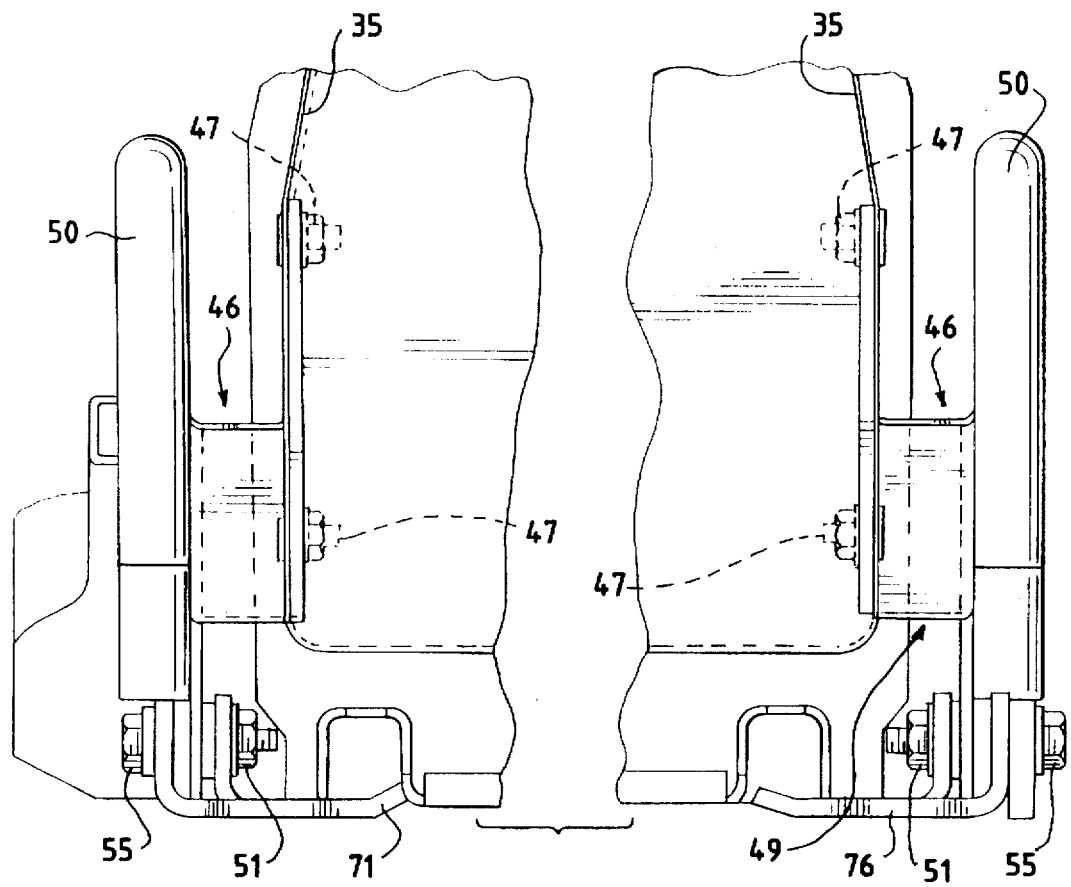
FIG. 4 is a rear view of the present invention showing the linkage assembly and hip restraint on both sides of the seat backrest.
Figure 5:
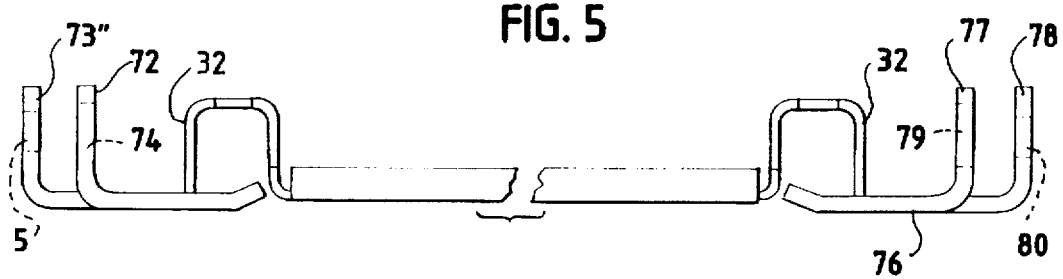
FIG. 5 is a rear, cross-sectional view of the seat base of the present invention.
Figure 6:
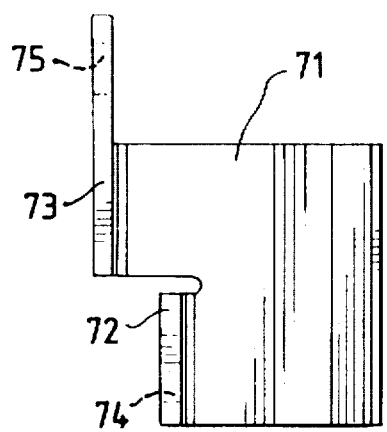
FIG. 6 is a top view of the left side ear of the seat base of the present invention.
Figure 8:
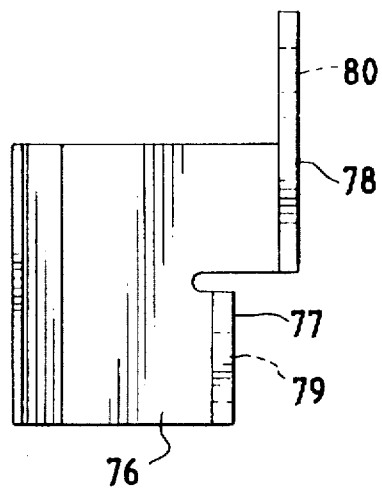
FIG. 8 is a top view of the right side ear of the seat base of the present invention.
Figure 7:
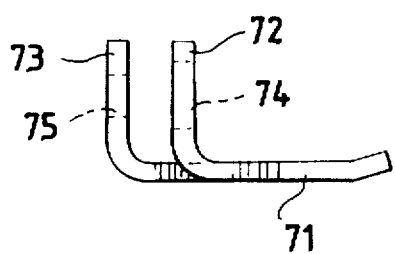
FIG 7 is a front view of the left side ear of the seat base of the present invention.
Figure 9:
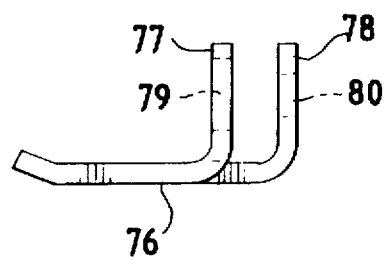
FIG. 9 is a front view of the right side ear of the seat base of the present invention.

As best seen in FIG. 3, weldment 41 comprises a single piece of metal or similar material as is known to one of ordinary skill in the art defining a first planar section 44 and second planar section 45. First planar section 44 curls around and upward to form second planar section 45. Weldment 49, shown in FIG. 4, is the identical, mirror image of weldment 41 and is the right-hand side weldment of seat 20. As seen in FIG. 4, between first planar section 44 and second planar section 45 is channel 46. Channel 46 receives seat back frame 35 which is attached to weldment 41 through multiple apertures 83 of second planar section 45.

Securely affixed to weldment 41 is hip restraint 50. Hip restraint 50 is constructed of rigid material of any sort well known to those skilled in the art, preferably tubular metal, to help prevent a seat occupant from sliding sideways out of the seat 31. Hip restraint 50 preferably will withstand 300 pounds of lateral force. Hip restraint 50 has forward vertical portion 56 which is affixed to weldment 41 near forward aperture 43 of weldment 41. Hip restraint 50 extends substantially vertically a distance sufficient to accomplish its purpose of restraining lateral movement, and then turns rearward approximately 90° forming elbow 57 and armrest portion 58. Armrest portion 58 extends rearward substantially horizontally and then turns downward at some angle and extends to a point where it is securely attached to weldment 41.

Weldment 41 is securely attached to seat back frame 35, via bolts 47 in attachment apertures 83 in the second planar surface 45 of weldment 41. Furthermore, seat back frame 35 is preferably a molded, stamped metal pan capable of holding a seat back cushion 36 or the like and having a rearwardly directed flange to which weldment 41 is attached.

As stated, in a preferred embodiment seat base 30 is fixedly mounted to platform 25. Base 30 may be rotatably, slidably or otherwise mounted to platform 25 as is known to those of ordinary skill in the art. Platform 25 is a substantially planar, rigid surface having a forward portion 26 and a hinged rearward portion 27. Rearward portion 27 is pivotally attached to a structure, most commonly a vehicle (not shown) at rotational axis 29. As seen in FIG. 1, this positionable mounting surface 25 allows folding seat 20 to be rotated upwards to gain access to an area beneath seat 20. This is referred to herein as the rearward rotated position.

In operation, folding seat 20 may be mounted to a structure requiring access to areas behind the seat 20 and under the seat 20 with limited access to each. For instance, in a forklift, the seat resides over the engine and needs to be positionable to allow access to the engine compartment beneath the seat. Furthermore, forklift vehicles are commonly run on propane gas and have LP tanks positioned behind the operator. Therefore, the seat back 35 needs to fold down to provide access to the LP gas tank.

In its operating position, seat base 30 is securely positioned substantially horizontally on platform 25 as seen in FIGS. 1 and 2. Seat back 35 is positioned in its upright, operating position, with hip restraints 50 on either side of seat 20. Seat back 35 may then fold forward as it folds down via pivot bolt 55 with hip restraint 50. Forward rotation of seat back 35 is stopped when hip restraint 50 contacts mounting surface 25 or when seat back cushion 35 meets seat bottom cushion 31, as seen in FIG. 1. This position of seat 20 is referred to herein as the forward folded position. By folding forward as it folds down, the distance, i.e. the radius, from the rotational axis 29 of mounting surface 25 to the folding seat 20 is increased. This increased radius maximizes the usable storage space behind folding seat 20 and maximizes accessibility to beneath seat 20, as seen in FIG. 1.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A seat assembly comprising:
    a base mounted to a platform and having a forward portion and a rearward portion;
    a seat cushion attached to the base;
    a backrest frame;
    a backrest cushion attached to the frame;
    a linkage assembly having forward and rearward portions rotatably connecting the backrest frame to the base at an intermediate pivot location, said assembly including a hip restraint and being operative to allow the backrest and hip restraint to rotate together relative to the base and seat cushion between an operating position and a forward folded position, said hip restraint being formed of tubular metal rising substantially vertically from the forward portion of the linkage assembly, extending substantially horizontally, and turning downward at an angle to the rearward portion of the linkage assembly whereby the hip restraint restricts lateral movement of a seat occupant.

2. The seat assembly of claim 1 wherein the seat back frame is a sheet metal pan.

3. The seat assembly of claim 1 wherein the seat bottom base is a sheet metal pan.

4. The seat assembly of claim 1 wherein the linkage assembly comprises one integral assembly.

5. The seat assembly of claim 1 wherein the hip restraint includes an armrest portion.

6. The seat assembly of claim 1 wherein the base includes a stop at a location rearward of the pivot location and the linkage assembly includes a notch in which the stop resides when the seat assembly is in the operating position.

7. The seat assembly of claim 1 wherein said platform is rotatable.

8. The seat assembly of claim 7 wherein the rotatable platform has an axis of rotation a distance X from the backrest frame and wherein the distance X is maximized when the seat is in its forward folded position.

9. The seat assembly of claim 1 wherein the backrest frame is rotatable until the backrest cushion meets the seat cushion.

10. The seat assembly of claim 9 wherein the backrest frame is rotatable until the hip restraint contacts the platform.

* * * * *